United States Patent Office 3,125,591
Patented Mar. 17, 1964

3,125,591
4-CHLORO-9α-FLUORO-PREGNENES AND DERIVATIVES THEREOF
Howard J. Ringold, Shrewsburg, Mass., and George Rosenkranz and John Edwards, Mexico City, Mexico, assignors to Syntex Corporation, Panama, Panama, a corporation of Panama
No Drawing. Filed Dec. 13, 1962, Ser. No. 247,789
Claims priority, application Mexico Apr. 25, 1958
9 Claims. (Cl. 260—397.45)

The present invention relates to novel cyclopentanophenanthrene derivatives.

More particularly, it relates to the 4-chloro and 4-bromo derivatives of 9α-halo cortisone, hydrocortisone, prednisone and prednisolone, represented by the following formula:

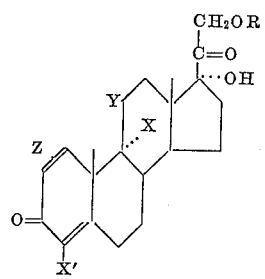

Wherein X represents chlorine, fluorine or bromine; X' represents chlorine or bromine; Y represents keto or β-hydroxy; Z represents a single or double bond between C–1 and C–2 and R represents hydrogen or a hydrocarbon carboxylic acyl group of up to 12 carbon atoms, saturated or unsaturated, of straight or branched chain, cyclic or mixed cyclic-aliphatic, conventionally substituted or unsubstituted. Typical examples of such acyl groups well known in the art are for example, acetate, propionate, butyrate, hemisuccinate, enanthate, caproate, benzoate, trimethylacetate, cyclopentylpropionate, acetoxypropionate and β-chloropropionate.

The novel compounds of the present invention exhibit valuable therapeutic properties, showing anti-inflammatory, glycogenic, anti-androgenic, anti-estrogenic and anti-fibrillatory activities.

The process for making the compounds of the present invention is illustrated by the following sequence of reactions:

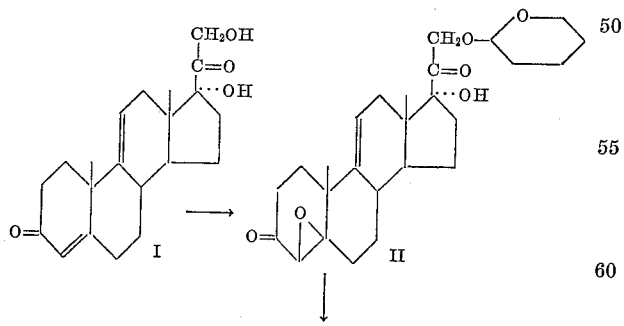

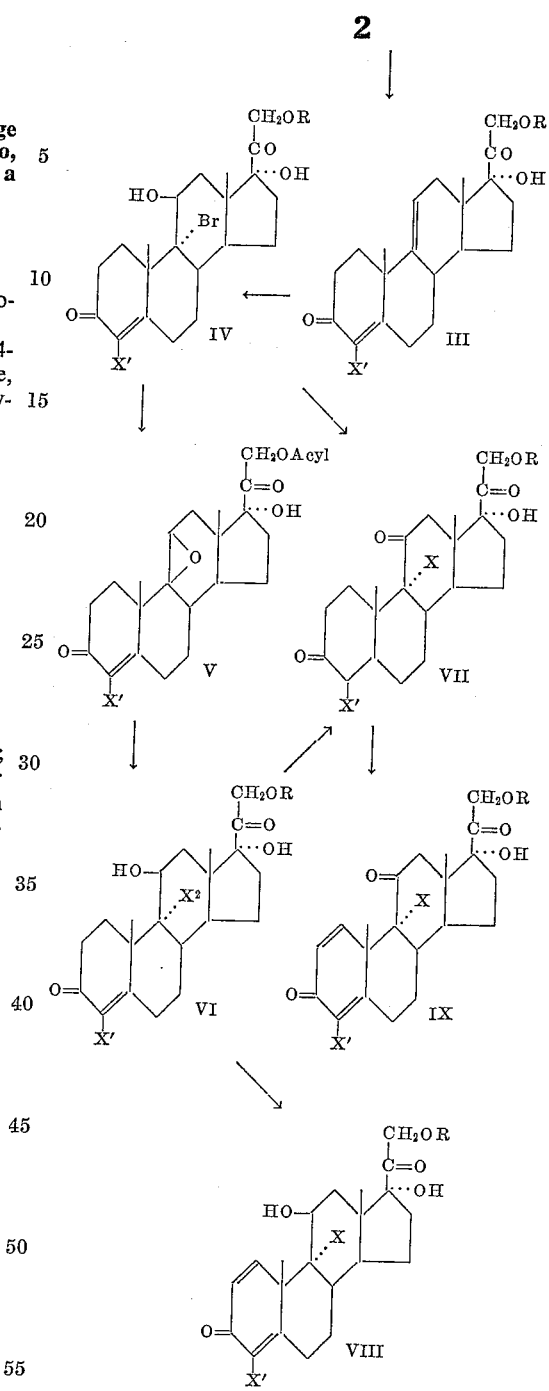

In the above equation X, X¹ and R represent the same groups as heretofore set forth X² represents fluorine or chlorine.

In practicing the above outlined process, in the known $\Delta^{4,9(11)}$-pregnadien-17α,21-diol-3,20-dione (I), we protected the 21-hydroxyl group, preferably by formation of its 21-(2'-tetrahydropyranyl)-ether, the double bond between C-4 and C-5 was then epoxidized, for example by reaction with hydrogen peroxide in alkaline medium, to obtain the 4β,5β-oxide of Formula II; the epoxide ring was opened by reaction with hydrogen chloride or hydrogen bromide preferably in acetone solution, with the simultaneous regeneration of the double bond between C-4 and C-5 and hydrolysis of the ether group at C-21; thus we produced the 4-halo-$\Delta^{4,9(11)}$-pregnadien-17α,21-diol-3,20-dione (III; R=H). The latter was esterified at C-21 and the esterified product (III; R=acyl) was treated with hypobromous acid. For this reaction with hypobromous acid we employed any reagent capable of liberating such acid, such as a N-bromoamide or N-bromoimide, or the hypobromide of an alkali or alkali-earth metal. Preferably we used N-bromosuccinimide in mixture with dioxane and in the presence of perchloric acid. Thus we obtained the corresponding 21-ester of the respective 4-halo-9α-bromohydrocortisone (IV; R=acyl).

In order to substitute the bromine at C-9α for fluorine or chlorine, we first treated the above compound with the alkali or alkali-earth salt of a lower aliphatic acid; using preferably potassium acetate; thus we produced the corresponding 21-ester of the respective 4-halo-9β,11β-oxido-$\Delta^4$-pregnen-17α,21-diol-3,20-dione (V), whose epoxide ring was opened by the addition of the elements of hydrogen chloride or fluoride. Thus we obtained the corresponding 21-ester of the respective 4,9α-dihalohydrocortisone (VI; $X^2$=F or Cl; R=acyl). The epoxide was preferably formed by refluxing with potassium acetate in mixture with ethanol and dioxane under anhydrous conditions; the epoxide ring was opened by treatment with the hydrogen halide under anhydrous conditions at low temperature, for example in chloroform solution.

The hydroxyl group at C-11 of IV and VI was then oxidized by conventional methods to a keto group, for example with chromium trioxide in mixture with aqueous acetic acid. Thus we obtained the corresponding 21-ester of the respective 4,9α-dihalo-cortisone (VII; R=acyl).

Upon dehydrogenation of IV, VI and VII there were produced the 21 - esters of 4,9α - dihalo - prednisolone (VIII) and 4,9α-dihalo-prednisone (IX). This dehydrogenation was effected preferably by refluxing with selenium dioxide in mixture with t-butanol, in the presence of pyridine and under an atmosphere of nitrogen, although we also carried out experiments with other known methods for effecting dehydrogenations of this type, with the same success; for example, it was carried out by incubation with Corynebacterium simplex.

The acyloxy group at C-21 of IV, VI, VII, VIII and IX can be hydrolyzed to the hydroxyl group, which in turn can be reesterified. For these transformations we used conventional methods, namely, for the hydrolysis, treatment with a methanol solution of sodium methoxide or potassium hydroxide at low temperature and under an atmosphere of nitrogen and, for the reesterification, the anhydride of a carboxylic acid of up to 12 carbon atoms in pyridine solution.

The present invention is a continuation in part of our copending applications Serial No. 807,768 filed on April 21, 1959 and 811,019 filed on May 5, 1959 now abandoned.

The following examples serve to illustrate but are not intended to limit the present invention.

Example I

To a mixture of 10 cc. of 2,3-dihydropyrane, 0.6 g. of p-toluenesulfonic acid monohydrate and 360 cc. of dioxane there was added 6.0 g. of $\Delta^{4,9(11)}$-pregnadien-17α,21-diol-3,20-dione (Fried et al., J. Am. Chem. Soc., 79, 1130 (1957)); the resulting suspension was stirred for 2½ hours at room temperature and then kept standing for 24 hours. It was poured into aqueous sodium bicarbonate solution, extracted several times with chloroform and the combined extract was washed with aqueous sodium bicarbonate solution and saturated aqueous sodium chloride solution, dried over anhydrous sodium sulfate and evaporated to dryness. The oily residue consisted of the 21-(2'-tetrahydropyranyl)-ether of $\Delta^{4,9(11)}$-pregnadien-17α,21-diol-3,20-dione, which was used without further purification for the next stage. In another experiment the pure compound was obtained by chromatography on neutral alumina.

6.5 of the above crude ether was dissolved in 200 cc. of methanol, cooled to 0° C. and slowly treated—simultaneously with 40 cc. of 30% hydrogen peroxide and 13 cc. of 10% aqueous sodium hydroxide solution, with stirring and keeping the temperature around 0° C. The mixture was kept at 0° C. for 20 hours and then poured into ice water; the oily precipitate was extracted with several portions of chloroform, the extract was washed with saturated aqueous sodium chloride solution, dried over anhydrous sodium sulfate and evaporated to dryness. There was thus obtained a mixture of the 21-(2'-tetrahydropyranyl)-ethers of 4α,5α-oxido-$\Delta^{9(11)}$-pregnen-17α,21-diol-3,20-dione and of 4β,5β-oxido-$\Delta^{9(11)}$-pregnen-17α,21-diol-3,20-dione; this mixture was used for the next step without further purification. In some experiments the separation of the isomers was achieved by chromatography on neutral alumina.

The above mixture of 4α,5α and 4β,5β-isomers was dissolved in 75 cc. of acetone, treated with 7.5 cc. of concentrated hydrochloric acid and kept for half an hour at room temperature. It was then diluted with water and the precipitate formed was collected, washed with water, dried and recrystallized from acetone. There was thus obtained, with simultaneous hydrolysis of the ether group at C-21, 4-chloro-$\Delta^{2,9(11)}$-pregnadien-17α,21 - diol - 3,20-dione; M.P. 234–237° C., $\lambda_{max}$. 254–256 log ε 4.11, [α]$_D$+128° (chloroform).

A solution of 5 g. of the above compound in 20 cc. of pyridine was treated with 5 cc. of acetic anhydride and kept standing at room temperature overnight. After pouring into water, the product was extracted with methylene chloride, the extract was washed with dilute hydrochloric acid, 5% sodium carbonate solution and water, dried over anhydrous sodium sulfate and evaporated to dryness, finally under reduced pressure. Recrystallization of the residue from acetone yielded 4-chloro-$\Delta^{4,9(11)}$-pregnadien-17α,21-diol-3,20-dione 21-acetate.

To a mixture of 5 g. of the above compound and 50 cc. of pure dioxane free of peroxides there was added 7 cc. of 0.5 N perchloric acid and then 2.3 g. of N-bromosuccinimide which was added slowly in the course of half an hour, with stirring and in the dark. The stirring was continued for 1 hour further, then kept standing for half an hour and treated with 10% sodium sulfite solution until the mixture no longer gave a blue reaction with the starch-potassium iodide paper. There was then added ice and 50 cc. of chloroform and the organic layer was separated, washed with ice water and evaporated under reduced pressure, taking care that the temperature did not rise over 25° C. The syrupy residue was triturated with 20 cc. of acetone, cooled in the refrigerator and the crystalline precipitate was collected. There was thus obtained 4-chloro-9α-bromo-hydrocortisone 21-acetate.

To a solution of 4 g. of anhydrous potassium acetate in 40 cc. of absolute ethanol heated nearly to boiling there was added a mixture of 5 g. of 4-chloro-9α-bromo-hydrocortisone 21-acetate and 20 cc. of dioxane. The mixture was refluxed for 40 minutes, cooled in an ice bath, treated with 90 cc. of ice water, with vigorous stirring, and the precipitate was collected by filtration, thus giving 4-chloro-9β,11β - oxido - $\Delta^4$ - pregnen - 17α,21-diol-3,20-dione 21-acetate.

4 g. of the above compound was dissolved in 90 cc. of chloroform in a polyethylene container fitted with a magnetic stirrer and cooled to 0° C. With stirring and maintaining the temperature at around 0° C., there was then introduced for 20 minutes a slow stream of dry hydrogen fluoride through a polyethylene tube. The mixture was kept for 2 hours more at 0° C. and then cautiously treated under stirring with a suspension of sodium bicarbonate in water until the mixture showed a weakly alkaline reaction. The mixture was transferred to a separatory funnel, the chloroform layer was separated, washed with water, dried over anhydrous sodium sulfate and evaporated to dryness under reduced pressure. Recrystallization of the residue from acetone-hexane furnished 4-chloro-9α-fluoro-hydrocortisone 21-acetate.

A solution of 3 g. of the above compound in 90 cc. of glacial acetic acid was slowly treated under stirring with a solution of 1.2 g. of chromium trioxide in 18 cc. of 80% acetic acid, while the temperature was maintained below 20° C. After 2 hours standing at room temperature, the mixture was poured into ice water and the precipitate was collected, washed with water, dried under vacuum and recrystallized from acetone. There was thus obtained 4-chloro-9α-fluoro-cortisone 21-acetate.

*Example II*

A solution of 4 g. of 4-chloro-9β,11β-oxido-Δ⁴-pregnen-17α,21-diol-3,20-dione 21-acetate, obtained in accordance with the previous example, in 40 cc. of chloroform was treated under stirring and in the course of 35 minutes with 30 cc. of a previously cooled 0.45 N solution of dry hydrogen chloride in chloroform, while the temperature was maintained at around 0° C. Ice water was added and the chloroform layer was separated, washed with 5% aqueous sodium carbonate solution and with water, dried over anhydrous sodium sulfate and evaporated to dryness. The residue was purified by recrystallization from acetone, thus producing 4,9α-dichloro-hydrocortisone 21-acetate.

By subsequent oxidation of the 11β-hydroxyl group of this compound, such as described in the previous example, there was obtained 4,9α-dichloro-cortisone 21-acetate.

*Example III*

The 11β-hydroxyl group of 4-chloro-9α-bromo-hydrocortisone 21-acetate, described in Example I, was oxidized by the method described in such example; there was thus obtained 4-chloro-9α-bromo-cortisone 21-acetate.

*Example IV*

To a suspension of 1 g. of 4-chloro-9α-bromo-hydrocortisone 21-acetate in 10 cc. of absolute methanol there was added a solution of sodium methoxide prepared by dissolving 60 mg. of sodium metal in 5 cc. of absolute methanol; the addition was carried out slowly, under an atmosphere of nitrogen and at 0° C. The mixture was stirred under nitrogen at 0° C. for 1 hour, poured into 100 cc. of saturated aqueous sodium chloride solution containing 0.3 cc. of acetic acid and the precipitate formed was collected, washed with a little cold water, dried under vacuum and recrystallized from acetone-hexane. There was thus obtained the free 4-chloro-9α-bromo-hydrocortisone.

*Example V*

By the same method there was hydrolyzed the acetate group of the 21-acetates of 4,9α-dichloro-hydrocortisone, of 4-chloro-9α-fluoro-hydrocortisone, of 4-cholro-9α-bromo-cortisone, of 4-chloro-9α-fluoro-cortisone and of 4,9α-dichloro-cortisone, to produce the respective steroids with the free hydroxyl group.

*Example VI*

In the method of Example I there was substituted for the acetic anhydride, propionic anhydride, to produce the 21-propionate of Δ⁴,⁹⁽¹¹⁾-pregnadien-17α,21-diol-3,20-dione; there were then obtained the 21-propionates of a 4-chloro-9α-bromo-hydrocortisone, of 4-chloro-9β,11β-oxido-Δ⁴-pregnen-17α,21-diol-3,20-dione, of 4-chloro-9α-fluoro-hydrocortisone and of 4-chloro-9α-fluoro-cortisone, respectively.

*Example VII*

The 21-propionate of 4-chloro-9β,11β-oxido-Δ⁴-pregnen-17α,21-diol-3,20-dione, obtained as described in the previous example, was treated with hydrogen chloride, in accordance with the method of Example II. There was obtained 4,9α-dichloro-hydrocortisone 21-propionate, and then, by oxidation with chromic acid, 4,9α-dichloro cortisone 21-propionate.

*Example VIII*

By substituting for the anhydrides mentioned in Examples I and VI, other anhydrides of carboxylic acids of up to 12 carbon atoms, there were formed the corresponding 21-esters of 4-chloro-Δ⁴,⁹⁽¹¹⁾-pregnadien-17α,21-diol-3,20-dione, and from them there were obtained the corresponding 21-esters of the respective 4-chloro-9α-halo-analogs of hydrocortisone and cortisone. Typical esters made in this way included the benzoate and cyclopentylpropionate.

*Example IX*

In the method of Example I, in the step of opening the epoxide between C–4 and C–5, there was substituted the hydrochloric acid for aqueous concentrated hydrobromic acid, to produce a 21-ester of 4-bromo-Δ⁴,⁹⁽¹¹⁾-pregnadien-17α,21-diol-3,20-dione; there was then produced the corresponding 21-ester of 4,9α-dibromo-hydrocortisone. By following the methods described in Examples II–VII, there were then obtained the respective compounds brominated at C–4 instead of chlorinated at this position.

*Example X*

The ester group of all of the 21-esters of the 4,9α-dihalo analogs of cortisone and hydrocortisone was hydrolyzed in accordance with the method of Example IV. There were thus obtained the corresponding dihalo analogs of cortisone and hydrocortisone under the free form.

Upon reesterification, by reaction with the anhydride of a carboxylic acid of up to 12 carbon atoms, in pyridine solution, there was prepared a great variety of their 21-esters including in addition to the propionates, acetates, cyclopentylpropionates and benzoates previously described, the butyrates, hemisuccinates, enanthates, caproates, trimethylacetates, phenylpropionates, acetoxy-propionates and β-chloropropionates.

*Example XI*

A mixture of 2 g. of 4-chloro-9α-fluoro-hydrocortisone 21-acetate, 100 cc. of anhydrous t-butanol, 0.9 g. of selenium dioxide and 0.6 cc. of pyridine was refluxed under an atmosphere of nitrogen for 72 hours and then filtered through celite, washing the filter with hot t-butanol; the filtrate and washings were combined and evaporated to dryness under reduced pressure; the residue was dissolved in acetone, treated with decolorizing charcoal, refluxed for half an hour, cooled, dried over anhydrous sodium sulfate, filtered and evaporated to dryness. The residue was purified by chromatography on neutral alumina. There was thus obtained 4-chloro-9α-fluoro-Δ¹,⁴-pregnadien-11β,17α,21-triol-3,20-dione 21-acetate.

Saponification of the above compound with sodium methoxide in methanol solution, in accordance with the method of Example IV gave the free 4-chloro-9α-fluoro-prednisolone.

*Example XII*

By the following the oxidation method described in Example I, 800 mg. of 4-chloro-9α-fluoro-prednisolone 21-acetate were treated with chromium trioxide in aqueous acetic acid, thus producing 4-chloro-9α-fluoro-prednisone 21-acetate.

Upon saponification of the foregoing compound with sodium methoxide in methanol solution there was obtained the free compound.

Example XIII

By following the method described in Example XI, the the compounds listed below under I were dehydrogenated with selenium dioxide in t-butanol solution and then saponified with sodium methoxide in methanol, to give the corresponding pregnadiene free compounds (II).

| I | II |
|---|---|
| 4-chloro-9α-bromo-hydrocortisone 21-acetate. | 4-chloro-9α-bromo-prednisolone. |
| 4-chloro-9α-bromo-cortisone 21-acetate. | 4-chloro-9α-bromo-prednisone. |
| 4,9α-dichloro-cortisone 21-propionate. | 4,9α-dichloro-prednisone. |
| 4-9α-dibromo-cortisone-21-acetate | 4,9α-dibromo-prednisone. |
| 4-bromo-9α-chloro-cortisone 21-acetate. | 4-bromo-9α-chloro-prednisone. |
| 4-chloro-9α-bromo-hydro-cortisone 21-acetate. | 4-chloro-9α-bromo-prednisolone. |
| 4,9α-dichloro-hydro-cortisone 21-acetate. | 4,9α-dichloro-prednisolone. |
| 4-bromo-9α-chloro-hydrocortisone 21-acetate. | 4-bromo-9α-chloro-prednisolone. |
| Do | 4-bromo-9α-fluoro-prednisolone. |

Example XIV 1 g. of the 4-chloro-9α-fluoro-prednisolone was treated with 50 cc. of pyridine and 3 cc. of cyclopentylpropionic acid anhydride and the mixture was stirred for 48 hours at room temperature. After pouring into water, the product was extracted with ether, the extract was washed with dilute hydrochloric acid, 5% aqueous sodium carbonate solution and water, dried over anhydrous sodium sulfate and evaporated to dryness. Crystallization of the residue from acetone hexane furnished the cyclopentylpropionate of 4-chloro-9α-fluoro-$\Delta^{1,4}$-pregnadien-11β,17α,21-triol-3,20-dione.

Example XV

By following the method of the previous example, and using propionic, caproic and cyclopentylpropionic anhydrides as esterifying agents, 4-bromo-9α-fluoro-prednisone, 4-bromo-9α-fluoro-prednisolone and 4,9α-dichloroprednisolone were converted into the corresponding propionates, caproates and cyclopentylpropionates.

We claim:
1. A compound of the following formula:

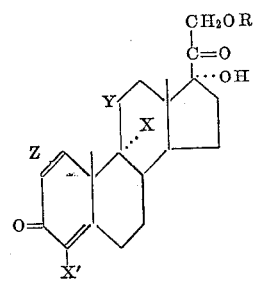

wherein R is selected from the group consisting of hydrogen and a hydrocarbon carboxylic acyl group of up to 12 carbon atoms; X is selcted from the group consisting of bromine, chlorine and fluorine; X' is selected from the group consisting of chlorine and bromine; Y is selected from the group consisting of β-hydroxy and keto and Z is selected from the group consisting of a single and a double bond between C–1 and C–2.

2. 4 - chloro - 9α - fluoro - $\Delta^4$ - pregnen - 17α,21 - diol-3,11,20-trione.

3. The 21-mono-hydrocarbon carboxylic acid esters of up to 12 carbon atoms of 4-chloro-9α-fluoro-$\Delta^4$-pregnen-17α,21-diol-3,11,20-trione.

4. 4 - chloro - 9α - fluoro - $\Delta^4$ - pregnen - 11β,17α,21-triol-3,20-dione.

5. The 21-monohydrocarbon carboxylic acid esters of up to 12 carbon atoms of 4-chloro-9α-fluoro-$\Delta^4$-pregnen-11β,17α,21-triol-3,20-dione.

6. 4 - chloro - 9α - fluoro-$\Delta^{1,4}$ - pregnadien - 17α,21-diol-3,11,20-trione.

7. The 21-monohydrocarbon carboxylic acid esters of up to 12 carbon atoms of 4-chloro-9α-fluoro-$\Delta^{1,4}$-pregnadien-17α,21-diol-3,11,20-trione.

8. 4 - chloro-9α - fluoro - $\Delta^{1,4}$ - pregnadien-11β,17α,21-triol-3,20-dione.

9. The 21-monohydrocarbon carboxylic acid esters of up to 12 carbon atoms of 4-chloro-9α-fluoro-$\Delta^{1,4}$-pregnadien-11β,17α,21-triol-3,20-dione.

No references cited.